United States Patent [19]
Chase et al.

[11] Patent Number: 5,561,521
[45] Date of Patent: Oct. 1, 1996

[54] TWO-BAND FOURIER TRANSFORM SPECTROMETER (FTS) WITH DICHROIC MICHELSON MIRRORS

[75] Inventors: Stillman C. Chase, Santa Barbara; Raymond W. Metz, Corona, both of Calif.

[73] Assignee: Santa Barbara Research Center, Goleta, Calif.

[21] Appl. No.: 452,586

[22] Filed: May 25, 1995

[51] Int. Cl.$^6$ .................................................. G01B 9/02
[52] U.S. Cl. ........................................ 356/346; 356/358
[58] Field of Search .................................. 356/345, 346, 356/358

[56] References Cited

U.S. PATENT DOCUMENTS 5,270,789  12/1993  Falco et al. ............................. 356/358

*Primary Examiner*—Frank Gonzalez
*Assistant Examiner*—Robert Kim
*Attorney, Agent, or Firm*—W. C. Schubert; W. K. Denson-Low

[57] ABSTRACT

Two dichroic mirrors (26, 30) and a dichroic beamsplitter (36) are introduced into the conventional Michelson Fourier transform spectrometer to accommodate two spectral bands. A conventional Michelson Fourier transform spectrometer (FTS) uses two mirrors (20, 22), one fixed (20) and the other moving (22). The present invention replaces each of the two mirrors (20, 22) with a pair of mirrors, one of which is a dichroic mirror (26, 30). The present invention involves inserting the first dichroic mirror (26) fixed in position between the beamsplitter (12) and the first plane mirror (20) and inserting a second dichroic minor (30), which can be moved in a direction normal to the plane surface, between the beamsplitter (12) and the second plane mirror (22). The first dichroic mirror (26) and second dichroic mirror (30) transmit long wavelength radiation and reflect short wavelength radiation. A dichroic beamsplitter (36) is also inserted in the interferometer assembly (10) to separate the two spectral bands in the third beam (24). By moving the second plane mirror (22) and the second dichroic mirror (30) a different amount to change the optical path difference between the second plane mirror (22) and the beamsplitter (12), and the optical path difference between the second dichroic mirror (30) and the beamsplitter (12), two spectral bands can be processed with different spectral resolutions.

19 Claims, 1 Drawing Sheet

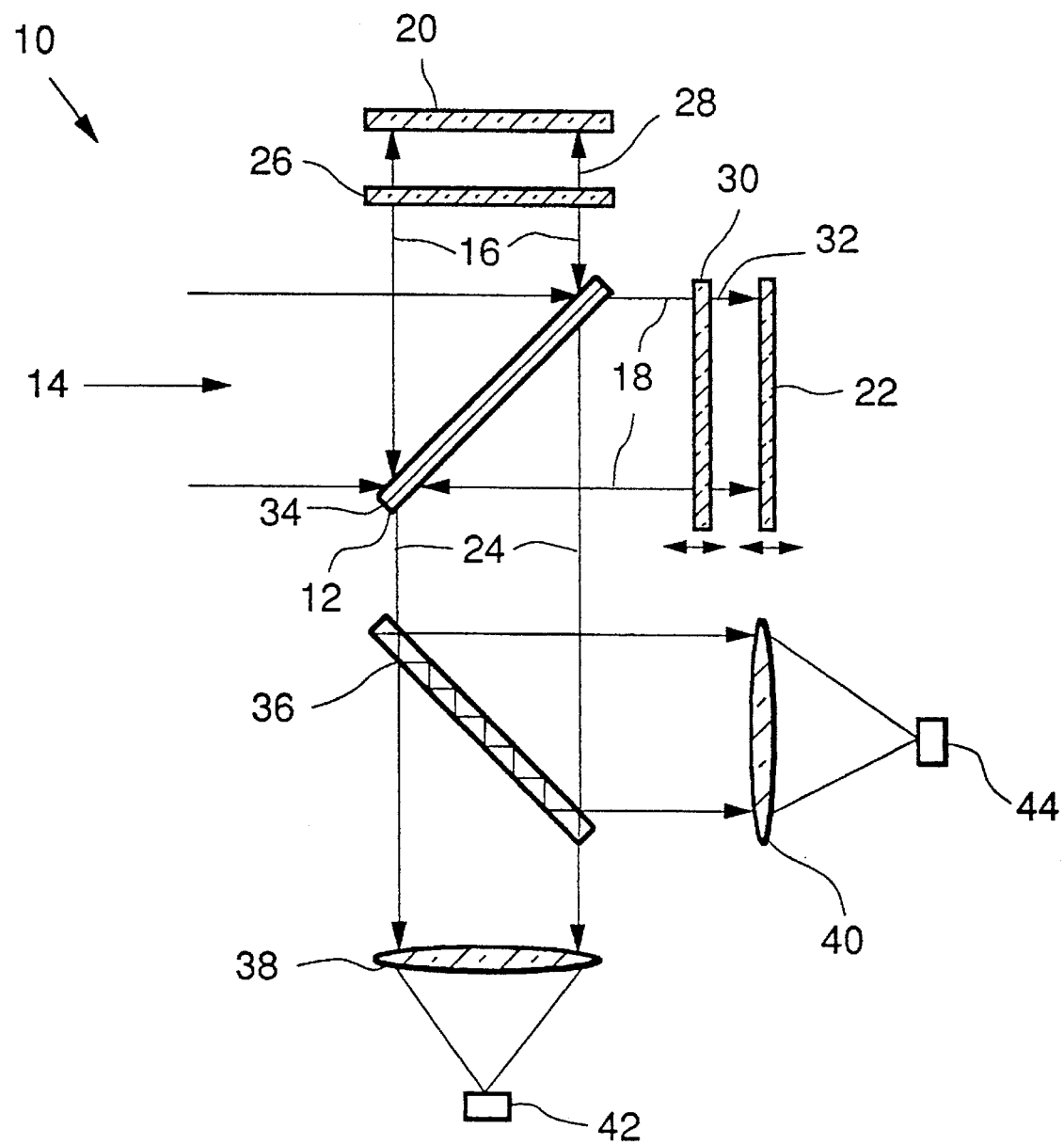

TWO-BAND FOURIER TRANSFORM SPECTROMETER (FTS) WITH DICHROIC MICHELSON MIRRORS

TECHNICAL FIELD

The present invention relates generally to interferometers and Fourier transform spectrometers, and, more particularly, to a method of providing two spectral bands in a conventional Fourier transform spectrometer.

BACKGROUND ART

The vertical temperature and moisture profiles of the atmosphere can be determined from a space instrument containing an atmospheric sounder which views downward and measures the spectral radiance coming from the atmosphere. Art atmospheric sounder, such as the Interferometer Thermal Sounder (ITS) which was, developed during a study funded by the European Meteorological Satellite (EUMETSAT) consortium, employs a Michelson Fourier transform spectrometer to measure the spectral radiance. (EUMETSAT is a consortium of 16 countries that operates the European weather satellites and is similar to National Oceanic and Atmospheric Administration or NOAA in the United States.)

A conventional Michelson Fourier transform spectrometer (FTS) uses two mirrors, one fixed and the other moving. The FTS comprises a beamsplitter, a first plane mirror being fixed in position, and a second plane mirror which can be moved in a direction normal to the plane surface. The beamsplitter divides the incoming light into two beams, a first beam and a second beam. The first beam is reflected off the first mirror and the second beam is reflected off the second mirror. The first beam and the second beam, after reflection, recombine and interfere at the beamsplitter. The first beam, which is transmitted through the beamsplitter, and the second beam, which is reflected from the beamsplitter, are recombined to form a third beam. The third beam is processed as the second plane mirror is moved to acquire spectral information about the in-coming light.

To provide two spectral bands in a conventional FTS, it would be necessary to either (1) provide multiple interferometers, (2) share the aperture of a single interferometer, or (3) beam split the output of a single interferometer. In the first option, which involves providing multiple interferometers, the size and weight of two complete systems is a disadvantage, particularly for satellite applications. In the second option, which entails sharing the aperture of a single interferometer, efficiency is lost due to the reduced collecting area. In the third option, where the output beam of a single interferometer is split, the signal-to-noise ratio is reduced because the dwell time (to be discussed below) of the single interferometer is not optimum for both bands.

Thus, what is needed is a means to accommodate two spectral bands, each with a different spectral resolution, using a single FTS assembly such that the dwell time and hence the signal-to-noise ratio is optimized for both bands.

DISCLOSURE OF INVENTION

In accordance with the present invention, two dichroic mirrors and a dichroic beamsplitter are introduced into the conventional Michelson Fourier transform spectrometer to accommodate two spectral bands. A conventional Michelson Fourier transform spectrometer comprises a beamsplitter, which divides the incoming light into two beams, a first plane mirror being fixed in position and a second plane mirror which can be moved in a direction normal to the plane surface. The present invention replaces each of the two mirrors with a pair of mirrors, one of which is a dichroic mirror. The method of the present invention includes inserting the first dichroic mirror fixed in position between the beamsplitter and the first plane mirror and inserting a second dichroic mirror, which can be moved in a direction normal to the plane surface, between the beamsplitter and the second plane mirror. The first dichroic mirror and the second dichroic mirror transmit long wavelength radiation and reflect short wavelength radiation. A dichroic beamsplitter is also inserted in the interferometer assembly to separate the two spectral bands.

By moving the second plane mirror and the second dichroic mirror a different amount to change the optical path difference between the second plane mirror and the beamsplitter and the optical path difference between the second dichroic mirror and the beamsplitter, two spectral bands can be processed with different spectral resolutions. Since the second plane mirror and the second dichroic mirror each travel the appropriate distance in the same amount of time, the dwell time and hence the signal-to-noise ratio is optimized for both bands.

Two separate optical systems and two separate detectors can be used to sense the long wavelength radiation and the short wavelength radiation which are separated by the dichroic beamsplitter. Furthermore, because the second plane mirror and the second dichroic mirror move at different velocities, different electrical frequencies in the interferogram are produced which can be easily separated. This allows the residual out-of-band interferogram signal to be eliminated.

The approach employed by the present invention is superior to the prior art approaches for providing two spectral bands in a conventional FTS because:

1. A single interferometer is used having the full available aperture;
2. Since the two moving mirrors (the second plane mirror and the second dichroic mirror) are moved a distance corresponding to the two desired resolutions over the same time span, the dwell time is optimized for both bands; and
3. Optical losses associated with the dichroic mirrors and the dichroic beamsplitter are far lower than those losses associated with a shared aperture.

Other objects, features, and advantages of the present invention will become apparent upon consideration of the following detailed description and accompanying drawings, in which like reference designations represent like features throughout the Figures.

BRIEF DESCRIPTION OF THE DRAWINGS

The sole Figure is a schematic diagram of a two-band Fourier transform spectrometer.

BEST MODES FOR CARRYING OUT THE INVENTION

Reference is now made in detail to a specific embodiment of the present invention, which illustrates the best mode presently contemplated by the inventors for practicing the invention.

The basis of the present invention is a conventional Michelson Fourier transform spectrometer with plane mirrors. A Michelson Fourier transform spectrometer is based on the Michelson interferometer.

Referring now to the sole Figure, an interferometer assembly 10 of a Michelson interferometer comprises: a beamsplitter 12 (which divides incoming light 14 into two beams, a first beam 16 and a second beam 18), a reference mirror 20, and a reflective surface 22. The first beam 16 is reflected off the reference mirror 20 and the second beam 18 is reflected from the reflective surface 22. The first beam 16 and the second beam 18, after reflection from the reference mirror 20 and the reflective surface 22, respectively, recombine and interfere at the beamsplitter 12. The first beam 16, which is transmitted through the beamsplitter 12, and the second beam 18, which is reflected from the beamsplitter, recombine to form a third beam 24.

(Interferometers that are not spectrometers fall into a class of measurement devices such as interferometric measurement devices and instruments that measure flatness or wavefront accuracy. There may be some utility in interferometric measurement devices and instruments that make two measurements at a time by operating at two wavelengths simultaneously.)

In the Michelson Fourier transform spectrometer, the reference mirror 20 and the reflective surface 22 are replaced with two mirrors, one fixed and the other moving. In the specific embodiment of the present invention, a first plane mirror 20 replaces the reference mirror and a second plane mirror 22 replaces the reflective surface. The first plane mirror 20 is fixed in position and the second plane mirror 22 can be moved in a direction normal to its plane surface.

What is novel about the present invention is the addition of a dichroic mirror between each of the two plane mirrors, (the first plane mirror 20 and the second plane mirror 22) and the beamsplitter 12 and the manner in which the two plane mirrors are moved.

Referring again to the sole Figure, a schematic diagram of the two-band Fourier transform spectrometer of the present invention is depicted. Collimated incoming light 14 enters the interferometer assembly 10 (or interferometer) from the left, impinging on the beamsplitter 12. The beamsplitter 12 divides the incoming light 14 into two beams, the first beam 16 which is reflected off of the beamsplitter and the second beam 18 which is transmitted through. The first beam 16 travels to a first dichroic mirror 26 which is fixed in position. The short wavelength radiation is reflected from the first dichroic mirror 26. The long wavelength radiation, carried on beam 28, passes through the first dichroic mirror 26 and travels onto the first plane mirror 20 which is also fixed in position. The long wavelength radiation, carried on beam 28, is reflected from the first plane mirror 20 and passes again through the first dichroic mirror 26. The long wavelength radiation and the short wavelength radiation components then travel back to the beamsplitter 12.

A similar process takes place with the second beam 18. The second beam 18 travels to a second dichroic mirror 30, which can be moved in a direction normal to the plane surface. The short wavelength radiation is reflected from the second dichroic mirror 30. The long wavelength radiation, carded on beam 32, passes through the second dichroic mirror 30 and travels onto the second plane mirror 22, which can also be moved in a direction normal to the plane surface. The long wavelength radiation carried on beam 32 is reflected from the second plane mirror 22 and passes again through the second dichroic mirror 30. The long wavelength radiation and the short wavelength radiation components then travel back to the beamsplitter 12. The processes involving with the first beam 16 and the second beam 18 are identical except that both the second dichroic mirror 30 and the, second plane mirror 22 can be moved independently in a direction normal to their plane surfaces.

After reflection off the second dichroic mirror 30 and the second plane mirror 22, the radiation from the second beam 18 interacts with the radiation arriving from the first beam 16 at the beamsplitter 12. Interference takes place along the surface of the beamsplitter coating 34, which is sandwiched between two equal thicknesses of optical material so that the optical path is identical in each arm of the interferometer 10. Sandwiching the beamsplitter coating 34 between equal thicknesses of the beamsplitter material is particularly important if the beamsplitter material has dispersion over the wavelength band of interest. The resultant radiation comprising both the first beam 16 transmitted through and the second beam 18 reflected from the beamsplitter 12 forms a third beam 24. The third beam 24 travels onto a longwave pass dichroic beamsplitter 36 that separates the two spectral bands. Separate optical systems, an optical system for the long wavelength band 38 and an optical system for the short wavelength band 40, then focus the radiation corresponding to the long wavelength band and the short wavelength band onto two separate detectors, a detector 42 optimized for the long wavelength band, and a detector 44 optimized for the short wavelength band.

As the second dichroic mirror 30 is moved, the optical path difference between, the second dichroic mirror and the beamsplitter 12 changes with respect to the optical path difference between the first dichroic mirror 26 and the beamsplitter. When the path differences are equal (i.e., zero path difference), maximum constructive interference occurs and the short wavelength radiation entering the interferometer 10 adds in-phase, thereby producing a maximum signal.

As the second plane mirror 22 is moved, the optical path difference between the second plane mirror and the beamsplitter 12 changes with respect to the optical path difference between the first plane mirror 20 and the beamsplitter. Again, when the path differences are equal (i.e., zero path difference), maximum constructive interference occurs and the long wavelength radiation entering the interferometer 10 adds in-phase, thereby producing a maximum signal.

As each moving mirror, the second dichroic mirror 30 and the second plane mirror 22, is moved away from the respective zero path difference (ZPD) positions, interference produces a characteristic interferogram detector output. This detector output signal can be analyzed to provide spectral information about the incoming light 14. The spectral resolution of the FTS is inversely proportional to the distance that each moving mirror, the second dichroic mirror 30 and the second plane mirror 22, is moved away from ZPD.

The novelty of this invention is that by moving the second dichroic mirror 30 and the second plane mirror 22 different amounts, two spectral bands can be processed, each having different spectral resolutions. If the second dichroic mirror 30 and the second plane mirror 22 are moved different distances, but over the same time span, then the dwell time is optimized for both bands. This feature of the present invention is important for system applications in which signal-to-noise ratio is critical, since the dwell time corresponds to the interval over which each sample of the detector output can be averaged. In essence, during the dwell time, frequency components representing each spectral element in the spectrum are added. The frequency components are added during the inverse Fourier transform process.

In a conventional FTS having two spectral bands, it would be necessary to stop taking data on the low spectral resolution band when the correct mirror displacement was reached. Stopping data acquisition on the low resolution band shortens the available dwell time over which the detector output can be averaged. In the particular meteorological application envisioned for the present invention, optimizing the dwell time for the low spectral band would result in a factor of two improvement in signal-to-noise ratio.

For the application envisioned, the spectral resolution of the two spectral bands is different by a factor of four. Thus, the low resolution mirror (in this application the second dichroic mirror 30) has a factor of four smaller displacement and a factor of four lower velocity than the other moving mirror, i.e., the second plane mirror 22.

The two dichroic mirrors, the first dichroic mirror 26 and the second dichroic mirror 30, have a high reflectance for short wavelength radiation and high transmittance for long wavelength radiation, which is in the range of 95% for each. Thus, the residual 5% out-of-band contribution could cause a significant spurious signal. The residual 5% out-of-band signal, however, can be eliminated in the present invention by electronic filtering. The electrical frequencies produced at the detectors (42 and 44) are equal to the product of the mirror velocity and the frequencies of the radiation. The factor of four in velocity between the second dichroic mirror 30 and the second plane mirror 22 produces electrical frequencies that can easily be filtered out. This is a major feature of the present invention.

It also might be desirable to make two measurements having the same resolution, but at different wavelengths. The present invention allows for such a case where two measurements at different wavelengths are made having the same resolution. In this case, the residual 5% out-of-band signal might pose a problem, since the mirrors, the second dichroic mirror 30 and the second plane mirror 22, would operate over the same dwell time. If, however, there were a reason to operate at the same resolution, then the mirrors, the second dichroic mirror 30 and the second plane mirror 22, could be moved the same distance, but over different periods of time to produce different frequencies that could be easily be filtered.

INDUSTRIAL APPLICABILITY

The Fourier Transform Spectrometer for processing two spectral bands described herein is expected to find use, for example, in atmospheric sounders in satellites. The present invention replaces a previous design, the Interferometer Thermal Sounder (ITS), which used a single interferometer with a shared aperture and no dichroic beamsplitters. The description herein is a typical application of this invention. Other variants may be made without altering the principles of the proposed invention.

The foregoing description of the preferred embodiment of the present invention has been presented for proposes of illustration and description. It is not intended to be exhaustive or to limit the invention to the precise form disclosed. The method of providing two spectral bands in a Fourier transform spectrometer described herein is not limited to Fourier transform spectrometers but may find uses in other instruments based on the Michelson interferometer. There might be some utility in interferometric measurement devices and instruments that measure flatness or wavefront accuracy and that make two measurements at a time by operating at two wavelengths simultaneously. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

What is claimed is:

1. A Fourier transform spectrometer for processing two spectral bands comprising radiation of a first spectral band and radiation of a second spectral band, said Fourier transform spectrometer comprising:

(a) a beamsplitter, which divides an incoming light into a first beam and a second beam;

(b) a first plane mirror being fixed in position upon which said first beam is reflected;

(c) a second plane mirror which can be moved in a direction normal to a plane surface, said second beam being reflected from said second plane mirror; said first beam and said second beam recombining and interfering at said beamsplitter to form a third beam;

(d) a first dichroic mirror fixed in position between said beamsplitter and said first plane mirror; and (e) a second dichroic mirror which can be moved in a direction normal to the plane surface, said second dichroic mirror being positioned between said beamsplitter and said second plane mirror, said second plane mirror and said second dichroic mirror being moved a different amount to change the optical path difference between said second plane mirror and said beamsplitter, and the optical path difference between said second dichroic mirror and said beamsplitter, to process radiation of said first spectral band and radiation of said second spectral band at different spectral resolutions.

2. The Fourier transform spectrometer of claim 1 where said first dichroic mirror and said second dichroic mirror transmit long wavelength radiation and reflect short wavelength radiation.

3. The Fourier transform spectrometer of claim 2 where said first dichroic mirror and said second dichroic mirror have a high reflectance for short wavelength radiation in the range of 95% and high transmittance for long wavelength radiation in the range of 95%.

4. The Fourier transform spectrometer of claim 1 further comprising a dichroic beamsplitter that separates radiation of said first spectral band and radiation of said second spectral band in said third beam.

5. The Fourier transform spectrometer of claim 4 comprising two separate optical systems and two separate detectors that sense radiation of said first spectral band and radiation of said second spectral band.

6. The Fourier transform spectrometer of claim 1 further including means for moving said second plane mirror and said second dichroic mirror a different amount in the same time span to optimize dwell time.

7. The Fourier transform spectrometer of claim 6 where said means for moving said second dichroic mirror is adapted to move said second dichroic mirror at a velocity that is a factor of four lower than that at which said second plane mirror is moved.

8. The Fourier transform spectrometer of claim 6 where said means for moving said second plane mirror and said second dichroic mirror are adapted to move at different velocities, thereby producing different electrical frequencies at said two separate detectors, said different electrical frequencies being easily separated to eliminate residual out-of-band signals.

9. A method of providing two spectral bands in an interferometer, said two spectral bands comprising radiation of a first spectral band and radiation of a second spectral band, and said interferometer comprising a beamsplitter, a reference mirror and a reflective surface, said beamsplitter dividing an incoming light into a first beam and a second beam, said first beam, which is reflected from said reference mirror, and said second beam, which is reflected from said reflective surface, recombining and interfering at said beamsplitter to form a third beam, said method comprising inserting a first dichroic mirror between said beamsplitter and said reference mirror, said first dichroic mirror transmitting radiation of the first spectral band and reflecting radiation of the second spectral band and inserting a second dichroic mirror between said beamsplitter and said reflecting surface, said second dichroic mirror transmitting radiation of said first spectral band and reflecting radiation of said second spectral band.

10. The method of claim 9 where a dichroic beamsplitter is employed to separate radiation of said first spectral band and radiation said second spectral band in said third beam.

11. The method of claim 10 where two separate optical systems and two separate detectors are used to sense radiation of said first spectral band and radiation of said second spectral band.

12. A method of providing two spectral bands in a Fourier transform spectrometer, said two spectral bands comprising radiation of a first spectral band and radiation of a second spectral band, said Fourier transform spectrometer comprising a beamsplitter, which divides an incoming light into a first beam and a second beam, a first plane mirror being fixed in position and a second plane mirror which can be moved in a direction normal to a plane surface, said first beam, which is reflected from said first plane mirror, and said second beam, which is reflected from said second plane mirror, recombining and interfering at said beamsplitter to form a third beam, said method comprising:

(a) inserting a first dichroic mirror fixed in position between said beamsplitter and said first plane mirror;

(b) inserting a second dichroic mirror which can be moved in a direction normal to the plane surface, said second dichroic mirror being positioned between said beamsplitter and said second plane mirror; and (c) moving said second plane mirror and said second dichroic mirror a different amount to change the optical path difference between said second plane mirror and said beamsplitter, and the optical path difference between said second dichroic mirror and said beamsplitter, to process radiation of said first spectral band and radiation of said second spectral band at different spectral resolutions.

13. The method of claim 12 where said first dichroic mirror and said second dichroic mirror transmit long wavelength radiation and reflect short wavelength radiation.

14. The method of claim 13 where said first dichroic mirror and said second dichroic mirror have a high reflectance for short wavelength radiation in the range, of 95% and high transmittance for long wavelength radiation in the range of 95%.

15. The method of claim 12 where a dichroic beamsplitter is employed to separate radiation of said first spectral band and radiation of said second spectral band in said third beam.

16. The method of claim 15 where two separate optical systems and two separate detectors are used to sense radiation of said first spectral band and radiation of said second spectral band.

17. The method of claim 12 where said second plane mirror and said second dichroic mirror are moved a different amount in the same time span to optimize dwell time.

18. The method of claim 17 where said second dichroic mirror is moved at a velocity that is a factor of four lower than the velocity that said second plane mirror is moved.

19. The method of claim 17 where said second plane mirror and said second dichroic mirror are moved at different velocities producing different electrical frequencies at said two separate detectors, said different electrical frequencies being easily separated such that residual out-of-band signal can be eliminated by filtering.

* * * * *